UNITED STATES PATENT OFFICE.

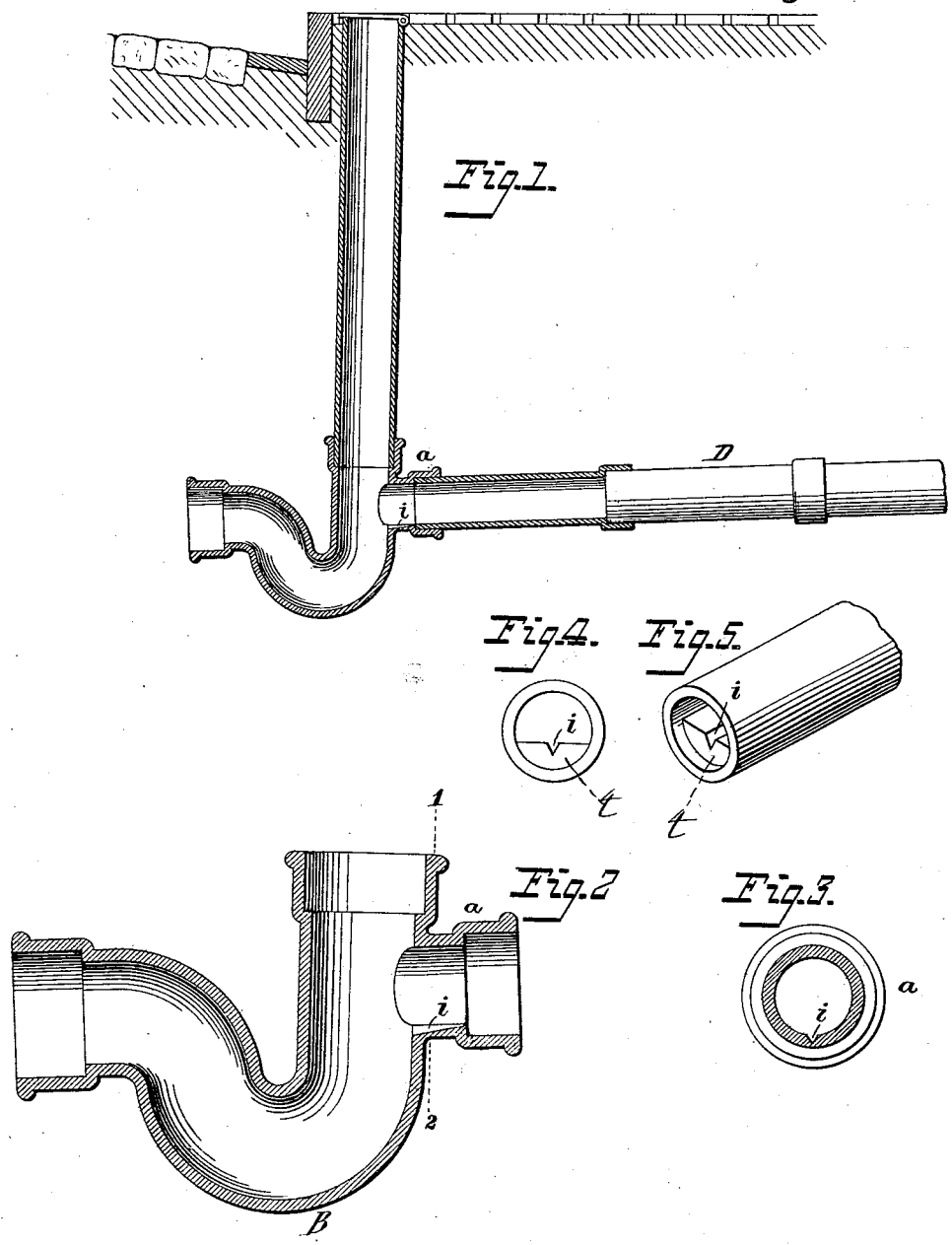

WILLIAM E. WORTHEN, OF NEW YORK, N. Y.

TRAP FOR WATER-WASTE DETECTORS.

SPECIFICATION forming part of Letters Patent No. 262,549, dated August 8, 1882.

Application filed March 31, 1882. (No model.)

*To all whom it may concern:*

Be it known that I, WILLIAM E. WORTHEN, of the city, county, and State of New York, have invented certain Improvements in Traps for Waste-Water Detectors, of which the following is a specification.

My invention is an improvement in wastewater detectors such as that for which Letters Patent of the United States were issued to me on the 22d day of August, 1878, the object of my improvement being to facilitate the construction of the parts and to insure the ready detection and approximate measurement of small streams flowing through the trap.

In the drawings, Figure 1 is a sectional elevation, showing a trap and its connections, illustrating my improvement. Fig. 2 is an enlarged section of the trap; Fig. 3, a cross-section on the line 1 2, Fig. 2. Fig. 4 is a cross-section of the sewer-pipe near its connection with the trap, showing a modification; and Fig. 5 is a perspective view of Fig. 4.

In the water-detector described in my aforesaid Letters Patent the trap opposite the inlet branch is provided with an inwardly-projecting lip, over which the inflowing water must pass and fall directly upon the surface of the body of water below, by its dripping indicating the fact of water escaping from the house-pipes.

In place of forming the trap with a lip, as aforesaid, my improvement consists in forming a V-shaped groove, $i$, in the lower part of the upper lateral branch, $a$, of the trap B, or in the end of the sewer-pipe extending into the trap, which groove collects the fluid passing from the house-sewer D into a solid stream, however slight the flow may be, thus insuring such a discharge as will indicate by its noise the passage of the fluid. The groove also forms an approximate measure of the quantity of water wasted, it being a notch the capacity of which is gaged so that its discharge can be closely estimated by inspection.

When the notch is in the branch $a$ the trap may be formed with greater facility than when the lip is used, the molding of the recess in the branch being effected much more readily than that of an inwardly-extending lip; but a lip may, if desired, be used with the groove, the latter serving to collect the water and to indicate the amount of the discharge.

It will be apparent that the trap may be made of metal or clay. The groove, instead of being made directly in the trap or pipe, may be made in a block, $t$, inserted in the end of the pipe or in the branch $a$, as shown in Figs. 4 and 5.

I claim—

1. The combination, in a waste-water detector, of a trap connecting with an inflow sewer-pipe, and provided at its junction with said pipe with a V-shaped groove, $i$, substantially as and for the purpose set forth.

2. A sewer-trap provided with an inlet branch, $a$, having an internal V-shaped groove, $i$, substantially as and for the purpose set forth.

In testimony whereof I have signed my name to this specification in the presence of two subscribing witnesses.

WILLIAM E. WORTHEN.

Witnesses:
THOS. D. WHISTLER,
ALBERT N. CONNETT.